US007917278B2

(12) United States Patent
Mulera et al.

(10) Patent No.: US 7,917,278 B2
(45) Date of Patent: Mar. 29, 2011

(54) SYSTEM AND METHOD FOR LEAN BLOWOUT PROTECTION IN TURBINE ENGINES

(75) Inventors: Tom G. Mulera, Mesa, AZ (US); Tim Belling, Phoenix, AZ (US); Shane R. Smith, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/615,013

(22) Filed: Nov. 9, 2009

(65) Prior Publication Data

US 2010/0145590 A1 Jun. 10, 2010

Related U.S. Application Data

(62) Division of application No. 11/286,246, filed on Nov. 22, 2005, now Pat. No. 7,614,238.

(51) Int. Cl.
*G06F 19/00* (2006.01)

(52) U.S. Cl. ........................ 701/100; 60/773; 60/39.281

(58) Field of Classification Search .................. 701/100; 477/30; 60/38.34, 39.281, 735, 776
See application file for complete search history.

(56) References Cited

U.S. PATENT DOCUMENTS

| | | | | |
|---|---|---|---|---|
| 4,277,940 | A | 7/1981 | Harner et al. | |
| 4,651,518 | A | 3/1987 | McLaughlin et al. | |
| 4,783,957 | A | 11/1988 | Harris | |
| 4,912,642 | A | 3/1990 | Larsen et al. | |
| 5,083,277 | A | 1/1992 | Shutler | |
| 5,465,570 | A | 11/1995 | Szillat et al. | |
| 5,596,871 | A | 1/1997 | Lenertz | |
| 5,694,760 | A | 12/1997 | Baxter | |
| 6,389,816 | B1 | 5/2002 | McCarty et al. | |
| 6,516,263 | B1 * | 2/2003 | Keller | 701/100 |
| 6,655,151 | B2 | 12/2003 | Mahoney et al. | |
| 7,168,254 | B2 | 1/2007 | Riley | |
| 7,210,297 | B2 | 5/2007 | Shah et al | |
| 7,320,213 | B2 * | 1/2008 | Shah et al. | 60/39.281 |
| 7,331,169 | B2 * | 2/2008 | Riley | 60/39.281 |
| 7,340,901 | B2 * | 3/2008 | Riley | 60/773 |
| 7,614,238 | B2 * | 11/2009 | Mulera et al. | 60/773 |
| 7,743,599 | B2 * | 6/2010 | Taware et al. | 60/39.091 |
| 2002/0121091 | A1 * | 9/2002 | Gilbreth et al. | 60/773 |
| 2004/0024516 | A1 | 2/2004 | Hook et al. | |
| 2006/0254282 | A1 * | 11/2006 | Riley | 60/773 |
| 2007/0051090 | A1 * | 3/2007 | Riley | 60/39.281 |
| 2007/0095070 | A1 * | 5/2007 | Riley | 60/773 |

* cited by examiner

*Primary Examiner* — Mark Hellner
*Assistant Examiner* — Helal A Algahaim
(74) *Attorney, Agent, or Firm* — Ingrassia Fisher & Lorenz, P.C.

(57) ABSTRACT

A lean blowout protection system and method is provided that facilitates improved lean blowout protection while providing effective control of turbine engine speed. The lean blowout protection system and method selectively and gradually biases the lean blowout (LBO) schedule based on current engine data. This facilitates improved lean blowout protection while providing effective control of turbine engine speed and temperature.

20 Claims, 5 Drawing Sheets

SYSTEM AND METHOD FOR LEAN BLOWOUT PROTECTION IN TURBINE ENGINES

This is a Divisional of application Ser. No. 11/286,246, filed Nov. 22, 2005.

FIELD OF THE INVENTION

This invention generally relates to turbine engines, and more specifically relates to fuel flow control in turbine engines.

BACKGROUND OF THE INVENTION

Gas Turbine Engines are used in modern aircraft and other vehicles for both propulsion and auxiliary power. They are also commonly used for electricity production. The reliable operation of these turbine engines is of critical importance. Typical gas turbine engines may be automatically controlled via an engine controller such as, for example, a DEEC (Digital Electronic Engine Controller). The engine controller receives signals from various sensors within the engine, as well as from various pilot-manipulated controls. In response to these signals, the engine controller regulates the operation of the gas turbine engine.

One issue in maintaining reliability in a turbine engine is avoiding lean blowout (LBO), a condition sometimes also referred to as flame out. In general, lean blowout occurs when the fuel flow falls below the level needed to maintain combustion. When a lean blowout occurs the combustion in the turbine engine ceases until it is restarted using the ignition system.

When used for vehicle propulsion the turbine engine must be able to operate over a wide range of speeds and it must be able to change engine speeds at a relatively high rate. For example, the turbine engine must be able to decelerate quickly when needed. This requires that the fuel system be able to reduce fuel flow sufficiently to slow the turbine engine at the needed rate. However, as described above, a low fuel flow can result in a lean blowout, especially when the low fuel flow occurs in a relatively cold engine. Such a lean blowout in a turbine engine is highly undesirable for reliability and safety reasons.

To prevent lean blowout, many turbine engines are designed to follow a lean blowout schedule that defines a minimum fuel flow delivered to the turbine engine based on operating conditions. During operation of the turbine engine the commanded fuel flow is maintained above a minimum value, called the lean blowout schedule. The lean blowout schedule is designed to ensure that lean blowout out does not occur in the engine, while still allowing for sufficient control of the turbine engine for low output and/or deceleration.

Unfortunately, previous techniques for setting the lean blowout schedule have had significant limitations. For example, previous techniques have used fixed lean blowout schedules. However, due to engine and control system variations and differing atmospheric conditions, these fixed lean blowout schedules can be higher than is required for most situations yet lean blowout can still occur in other situations. Thus, the use of fixed lean blowout schedules has reduced engine speed control and/or has been unable to completely eliminate the possibility of lean blowout. Hence, there remains a need for a system and method for controlling fuel flow in a turbine engine that provides needed engine control while further reducing the possibility of lean blowout.

BRIEF SUMMARY OF THE INVENTION

The present invention provides a turbine engine lean blowout protection system and method that facilitates improved lean blowout protection while providing effective control of turbine engine speed. The lean blowout protection system and method selectively biases the lean blowout (LBO) schedule based on current engine data. Specifically, the system and method adds a gradually increasing positive bias to the LBO schedule when the commanded fuel flow is greater than the LBO schedule by a specified margin. Then, when the commanded fuel flow falls below the margin the system and method gradually decreases the positive bias until the commanded fuel flow reaches the LBO schedule. The increasing and decreasing of the LBO bias provides a selectively increased LBO schedule that improves lean blowout protection while maintaining fuel flow control ability to decelerate the engine. Furthermore, the gradual nature of the LBO biasing helps assure that lean blowout is prevented while allowing the LBO schedule to return to the low, unbiased value if needed to attain low engine output (such as idle). The slower power or speed reduction to idle is small and is normally acceptable and preferable to lean blowout.

In one embodiment, the LBO bias is selectively disabled in certain circumstances to provide improved engine control in these circumstances. For example, the LBO bias can be selectively disabled in takeoff situations to facilitate a fast response in the event of a rejected takeoff Furthermore, the LBO bias can be selectively disabled during engine startup to facilitate low fuel flow during startup to avoid hot starts. In both deceleration from takeoff power and starting lean blowout is not likely. Thus, the present invention provides a turbine engine lean blowout protection system and method that facilitates improved lean blowout protection while providing effective control of turbine engine speed and temperature.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The embodiments of present invention provide a turbine engine lean blowout protection system and method that facilitates improved lean blowout protection while providing effective control of turbine engine speed. The lean blowout protection system and method selectively and gradually biases the lean blowout (LBO) schedule based on current engine data. This facilitates improved lean blowout protection while providing effective control of turbine engine speed and temperature.

Figure 1:
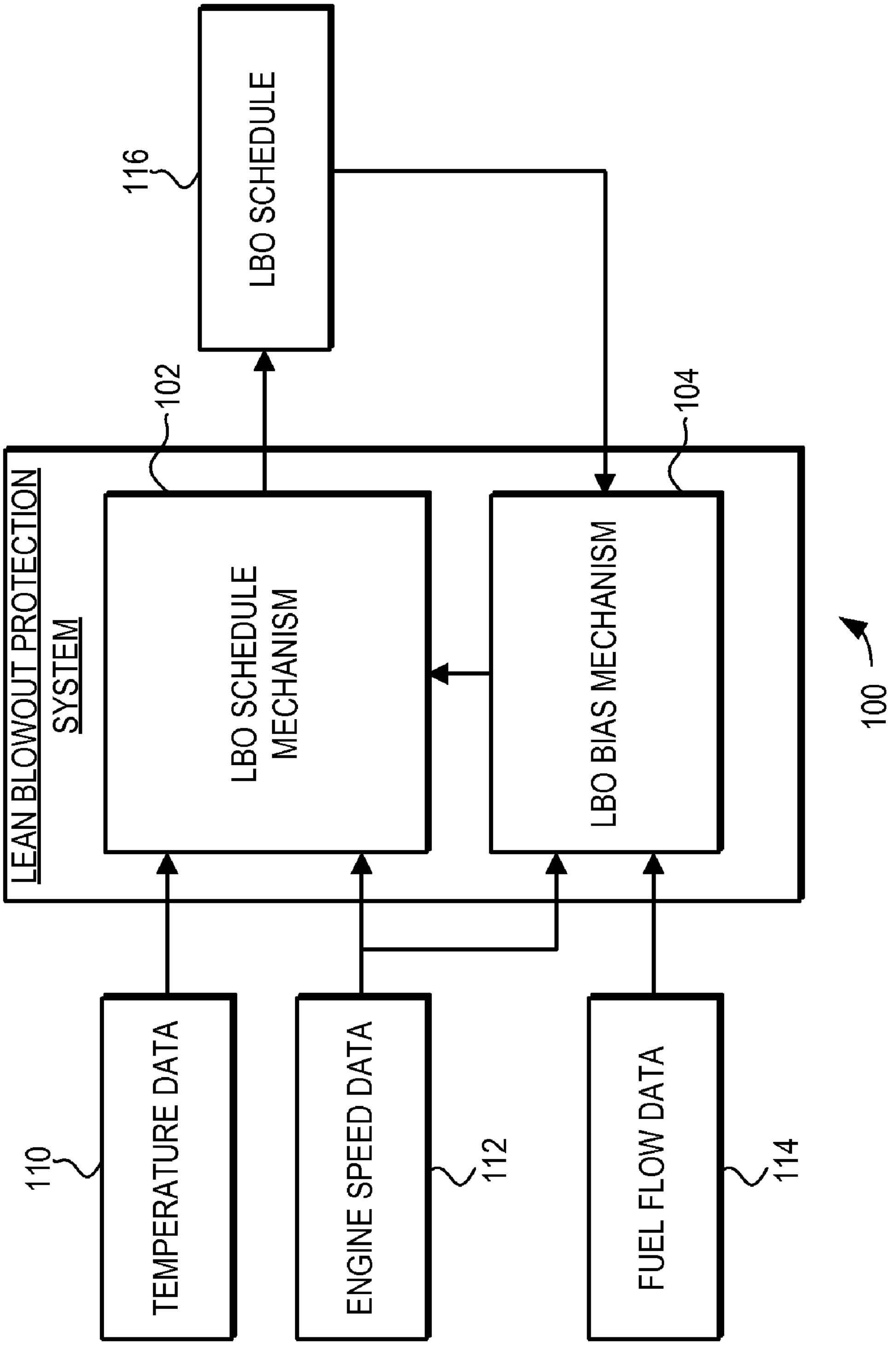
FIG. 1 is a schematic view of a lean blowout protection system in accordance with an embodiment of the invention.

Turning now to FIG. 1, a schematic view of a lean blowout protection system 100 is illustrated. The lean blowout protection system 100 includes a LBO schedule mechanism 102 and a LBO bias mechanism 104. The lean blowout protection system 100 receives temperature data 110, engine speed data 112, and commanded fuel flow data 114 and from that data generates an LBO schedule 116. The LBO schedule 116 defines the minimum fuel flow delivered to the turbine engine. Specifically, during operation of the turbine engine the LBO schedule 116 is used to ensure that the fuel flow to the turbine engine does not go below a level where lean blowout could occur in the turbine engine. The LBO schedule may be defined in fuel flow or other equivalent parameters such as fuel ratios, commonly called WFR. The term fuel ratios may be used synonymously herein with fuel flow. Fuel ratios is defined as fuel flow divided by combustor pressure, both in any convenient units. For example, fuel ratios is commonly defined as fuel flow, in pound per hour divided by combustor absolute pressure in pounds per square inch.

In general, the LBO schedule mechanism 102 receives the temperature data 110 and the engine speed data 112 and generates a preliminary LBO value. The LBO bias mechanism 104 receives the engine speed data 112, the commanded fuel flow data 114, and a feedback of the current LBO schedule 116. From this, the LBO bias mechanism 104 selectively biases the preliminary LBO value to generate the LBO schedule 116.

Specifically, the LBO bias mechanism 104 adds a gradually increasing positive bias when the commanded fuel flow is greater than the LBO schedule 116 by a specified margin. Then, when the commanded fuel flow falls below the margin the system and method gradually decreases the positive bias. The increasing and decreasing of the LBO bias provides a selectively increased LBO schedule 116 that improves lean blowout protection while maintaining fuel flow control ability to decelerate the engine. Furthermore, the gradual nature of the LBO biasing provided by the LBO bias mechanism 104 assures that LBO bias persists long enough to prevent lean blowout while allowing the LBO schedule 116 to return to the low, unbiased level to ensure that speed can be reduced to idle. The slower power reduction due to the bias is small and is normally acceptable and preferable to lean blowout.

In one embodiment, the LBO bias mechanism 104 selectively disables the bias in certain circumstances to provide improved engine control in these circumstances. For example, the LBO bias mechanism 104 can selectively disable the bias for takeoff situations to facilitate a fast response in the event of a rejected takeoff. Furthermore, the LBO bias mechanism 104 can selectively disable the bias during engine startup to facilitate low fuel flow during startup to avoid hot starts. Thus, the lean blowout protection system 100 with the LBO bias mechanism 104 provides improved turbine engine lean blowout protection while providing effective control of turbine engine speed and temperature.

Figure 2:
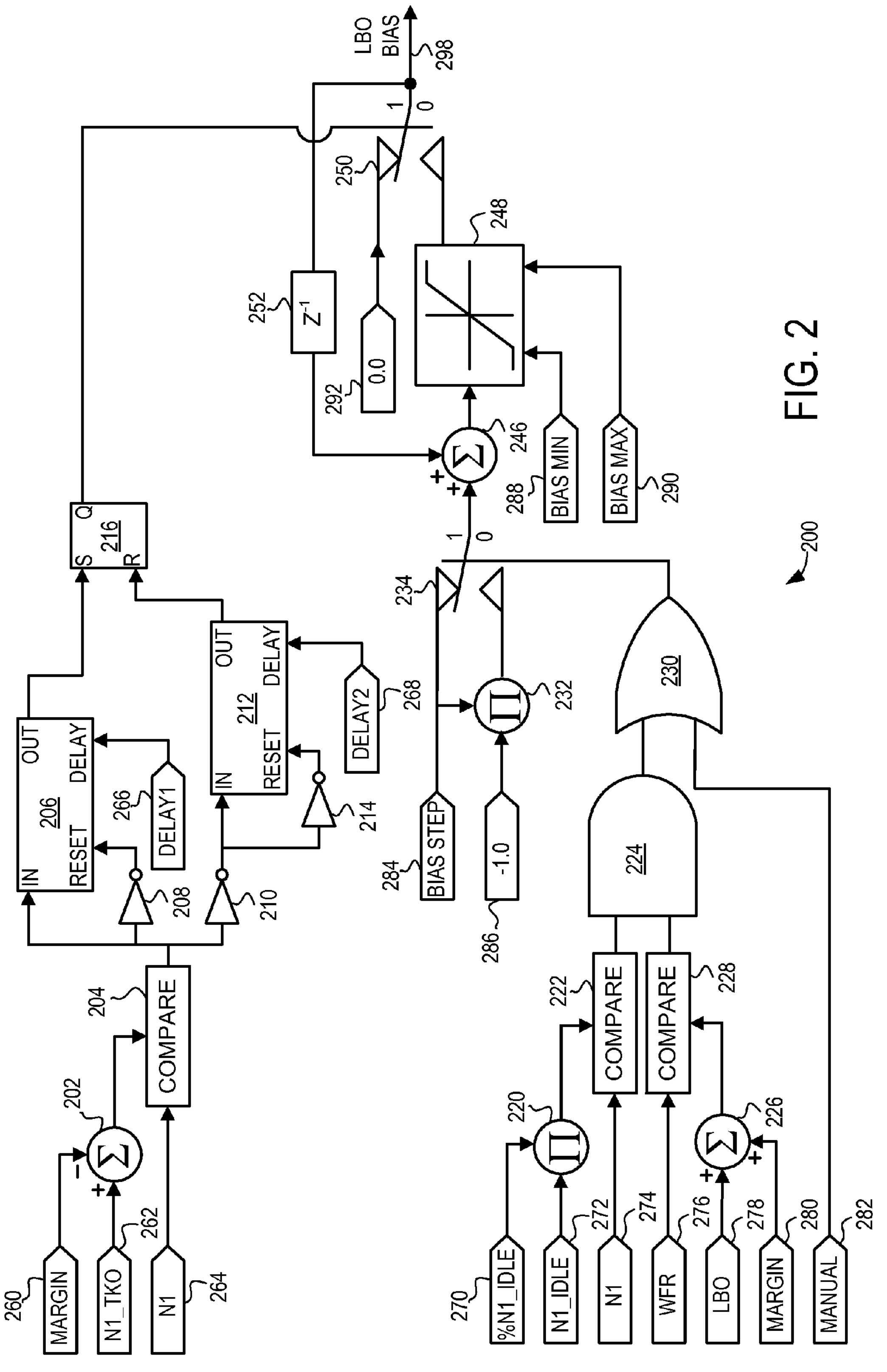
FIG. 2 is a schematic view an exemplary LBO bias mechanism in accordance with an embodiment of the invention.

Turning now to FIG. 2, a schematic view of an LBO bias mechanism 200 in accordance with one embodiment of the invention is illustrated. The LBO bias mechanism 200 is one example of the type of mechanism that can be used in the lean blowout protection system 100. In general, the LBO bias mechanism 200 provides a gradually increasing positive bias when the commanded fuel flow is greater than the LBO schedule by a specified margin. Then, when the commanded fuel flow falls below the LBO schedule plus the margin the system and method gradually decreases the positive bias until the commanded fuel flow reaches the LBO schedule. Additionally, the LBO bias mechanism disables the bias during takeoff and engine startup.

The LBO bias mechanism 200 includes subtraction logic 202, addition logic 226 and 246, multiplication logic 220 and 232, compare logic 204, 222, and 228, inverter logic 208, 210 and 214, delay logic 206 and 212, latch 216, AND logic 224, OR logic 230, switching logic 234 and 250, limiter logic 248 and ramp logic 252. The LBO bias mechanism 200 receives various sensor parameters and control values, including engine speed data, commanded fuel flow data, and the current LBO value. In the illustrated embodiments, the LBO bias mechanism receives a margin input 260, an N1_TKO input 262, an N1 input 264, a threshold input 266, a delay input 268, a % N1_IDLE input 270, an N1_IDLE input 272, an N1 input 274, a WFR input 276, a LBO input 278, a margin input 280, a manual input 282, a bias step input 284, a bias min input 288 and a bias max input 290.

In general, during operation of the turbine engine the current LBO schedule value is received at LBO input 278. A specified margin is received at margin input 280. The addition logic 226 adds the LBO schedule value to the margin and passes its output to the compare logic 228. The compare logic 228 receives the current commanded fuel flow from WFR input 276. Thus, the compare logic 228 compares the current commanded fuel flow to the LBO schedule plus the specified margin (e.g., 0.3 fuel ratios). When the current commanded fuel flow is greater than the LBO schedule plus the specified margin, the output of compare logic 228 is asserted. If the output of compare logic 222 is also asserted (which will be discussed in greater detail below) the output of AND logic 224 is asserted and passed to the OR logic 230. The OR logic 230 also receives the manual input 282. The manual input 282 facilitates manual enablement of the LBO bias. Thus, if either the output AND logic 224 or the manual input is asserted, the output of OR logic 230 will be asserted.

The bias step input 284 provides the increment that is used to gradually increase and decrease the LBO bias. Thus, the bias step input 284 is passed to a first input on switching logic 234. The bias step input 284 is also negated using multiplication logic 232 and the −1.0 input 286, and the negated bias step input 284 is passed to the second input on switching logic 234. When the output of OR logic 230 is asserted, the switching logic 234 selects the upper terminal and thus bias step input 284 is passed to the addition logic 246. When the output of OR logic 230 is not asserted, the switching logic 234 is selects the lower terminal and thus the negated bias step input 284 is passed to the addition logic 246. In one example implementation, the bias step input 284 is set to reduce the bias from BIAS MAX to BIAS MIN in about 15 seconds.

The addition logic 246 also receives the LBO bias value 298 through the delay logic 252. The addition logic 246 thus adds the bias step or the negated bias step to the previous LBO bias value. Thus, the addition logic 246 effectively gradually increments or decrements the LBO bias value as controlled by the OR logic 230 output.

The output of the addition logic 246 is passed to the limiter logic 248. The limiter logic 248 limits the range of LBO bias value to between the bias min value and the bias max value. Specifically, the limited output of the limiter logic 248 is passed through switching logic 250, and thus provides the LBO bias value when the switching logic 250 is switched to the lower terminal In one example implementation, the bias min value is zero and the bias max value is 1 fuel ratio.

To summarize the operation of the LBO bias mechanism 200 described so far, when the commanded fuel flow is greater than the current LBO level by a specified margin, the addition logic 246 increments the LBO bias by the bias step input 284 value. When the commanded fuel flow is not greater than the LBO plus the specified margin, the addition logic 246 decrements the LBO bias by the bias step input 284 value. The ramp logic 252 causes the incrementing and decrementing of the LBO bias, the bias step is selected to make the change gradual, and the limiter logic 248 limits the LBO bias to be between a specified bias minimum value and a bias maximum value. The selective incrementing and decrementing of the LBO bias provides a selectively increased LBO schedule that improves lean blowout protection while maintaining fuel flow control ability to decelerate the engine.

The LBO bias mechanism 200 also provides full bias when the control is in standby when the DEEC output is disabled and the engine is controlled by other "manual" means. This is accomplished by incrementing the LBO bias upward. Specifically, by asserting the manual input 282, the switching logic 234 can be controlled to increment the LBO bias. This provides for full bias to prevent lean blowout upon the transfer from standby to auto control.

The LBO bias mechanism 200 also facilitates selective disabling of the LBO bias in certain circumstances to provide improved engine control in these circumstances. For example, the LBO bias mechanism 200 can selectively disable the bias during engine startup to facilitate low fuel flow during startup to avoid hot starts. Furthermore, the LBO bias mechanism 200 can selectively disable the bias for takeoff situations to facilitate a fast response in the event of a rejected takeoff Specifically, the LBO bias mechanism 200 disables bias during engine startup by comparing the current engine speed to a specified percentage of the idle speed. N1 input 274 receives the current engine fan speed. The N1_IDLE input 272 specifies the N1 value that indicates full idle speed, and the % N1_IDLE input 270 is a percentage of the full idle speed used (e.g., 90%). The multiplication logic 220 multiplies the N1_IDLE input 272 by the percentage specified by % N1_IDLE 270. The compare logic 222 compares the N1 engine speed to the resulting product. If the N1 engine speed is less than the product, then the compare logic 222 output is not asserted. When the compare logic is not asserted, the LBO bias decrements as described above. Thus, if the N1 engine speed is less than a specified percentage of the N1_IDLE speed, then the LBO bias is decremented. It should be noted that in this particular embodiment the bias is decremented at slower speed and incremented at higher speed during startup rather than completely shut off. This helps avoid sudden changes in LBO bias that could otherwise occur during startup as speed approaches idle.

Additionally, the LBO bias mechanism 200 can selectively disable the bias for takeoff situations to facilitate a fast response in the event of a rejected takeoff. Specifically, the LBO bias mechanism 200 disables LBO bias during takeoff by comparing the current engine speed to the takeoff speed minus a specified margin. N1 input 264 receives the current engine fan speed. The N1_TKO input 262 specifies the N1 value that indicates takeoff speed, and the margin input 260 is a percentage of the full takeoff speed used as a margin (e.g., 7%). The subtraction logic 202 subtracts the margin from the N1_TKO 262. The compare logic 204 compares the N1 engine speed to the resulting value. If the N1 engine speed is greater than the N1_TKO value minus the margin percentage, then the compare logic 204 output is asserted.

The output of the compare logic 204 is passed to input of the delay logic 206, is inverted by inverter logic 208 and passed to the reset input of delay logic 206. Additionally, the output of the compare logic 204 is inverted by inverter logic 210, and the inverted output is passed to input of the delay logic 212, is inverted again by inverter logic 214 and passed to the reset input of delay logic 212.

The delay logic 206 and 212 are configured to reset immediately, but will delay passing an input to the output by a time specified by the delay input. Thus, when the N1 engine speed is greater than the N1_TKO value minus the margin percentage, then the compare logic 204 output is asserted, asserting the input to the delay logic 206. After a delay equal to the delay specified by the DELAY1 input 266, the set input on latch 216 is asserted. This causes the output Q of latch 206 to become asserted, which switches switching mechanism 250, causing the LBO bias to be immediately reset to zero.

The compare logic 204 asserted output is also passed to the delay logic 212 input through inverter logic 210. The inverted output is passed from the output of delay logic 212 after a delay equal to the delay specified by the DELAY2 input 268. When the N1 engine speed drops below the N1_TKO value minus the margin percentage, the compare logic 204 output is de-asserted, asserting the input to the delay logic 212. The inverted output is passed from the output of delay logic 212 after a delay equal to the delay specified by the DELAY2 input 268. This causes the output Q of latch 206 to become de-asserted, which switches switching mechanism 250, allowing the LBO bias to again be incremented and/or decremented by the output of switching logic 234.

Thus, delay logic 206 and 212 and latch 216 function to disable the LBO bias after a delay equal to DELAY1 when the N1 engine speed is above the N1_TKO value minus the margin percentage, and likewise function to enable LBO bias after a delay equal to DELAY2 when the N1 engine speed is below the N1_TKO value minus the margin percentage. Typically, DELAY2 would be selected to be much larger than DELAY1. For example, DELAY2 could be set to 9 seconds, while DELAY1 is set to 1 second. This causes LBO bias to be disabled relatively quickly, when needed, but causes LBO bias being enabled to be further delayed. This ensures that a relatively short time at high power will set the directly bias to zero. This corresponds to a warm engine which is unlikely to be at risk of lean blowout. Conversely, when the bias is set to zero it causes the bias to remain at zero for a relatively long period of time. This ensures that the LBO bias will be zero long enough for the engine to decelerate rapidly to idle power if power is suddenly reduced from takeoff power.

Thus, a lean blowout protection system using the LBO bias mechanism 200 provides improved turbine engine lean blowout protection while retaining effective control of turbine engine speed and temperature.

Figure 3:
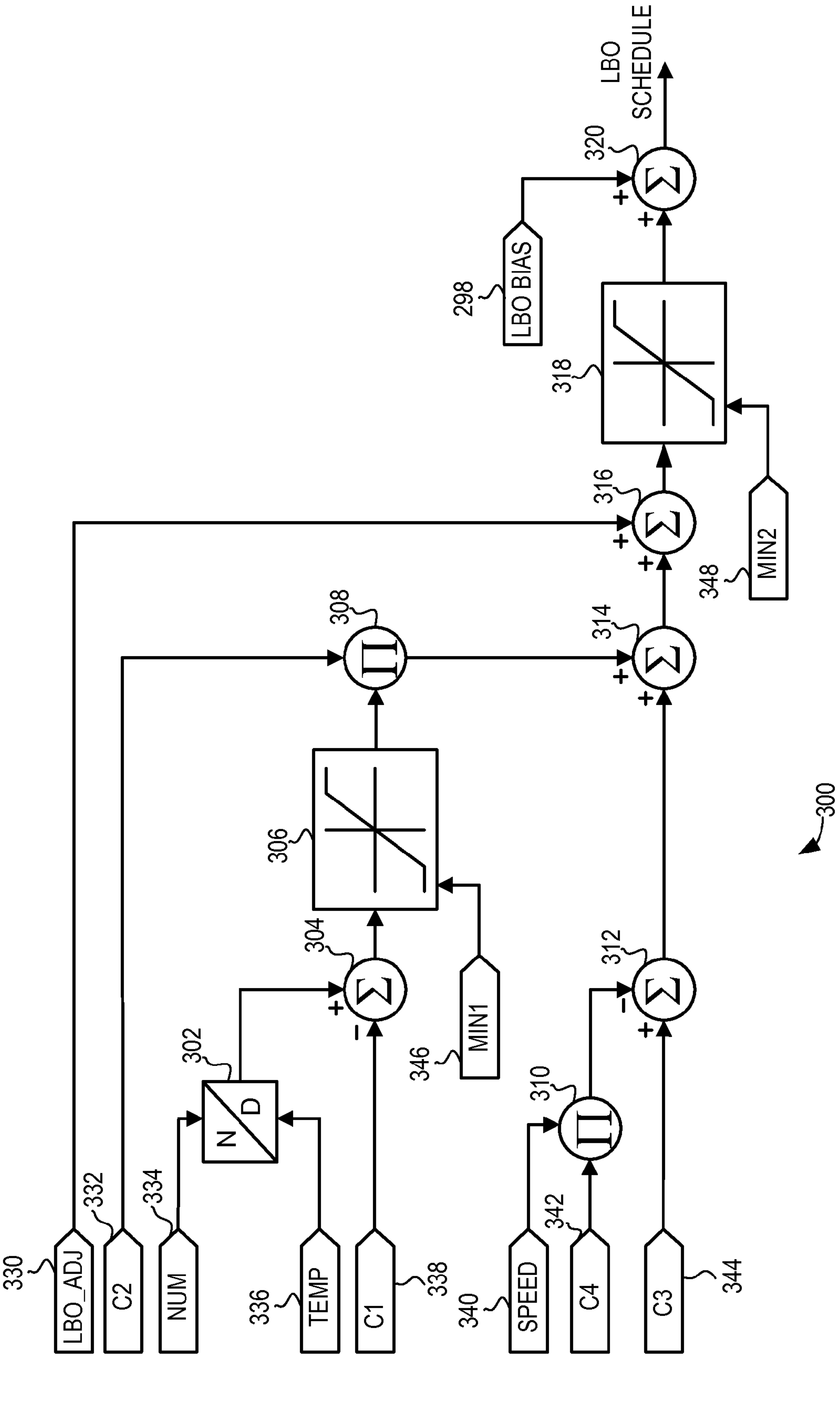
FIG. 3 is a schematic view an exemplary LBO schedule mechanism in accordance with an embodiment of the invention

Turning now to FIG. 3, a schematic view of an LBO schedule mechanism 300 in accordance with one embodiment of the invention is illustrated. The LBO schedule mechanism 300 is one example of the type of mechanism that can be used in the lean blowout protection system 100. In general, the LBO schedule mechanism 300 receives the temperature data and the engine speed data and generates a preliminary LBO value.

The LBO schedule mechanism 300 includes division logic 302, subtraction logic 304 and 312, addition logic 314, 316 and 320, multiplication logic 308 and 310, and limiter logic 306 and 318. The LBO schedule mechanism 300 receives various sensors parameters and control value values, including engine speed data and temperature data. In the illustrated embodiments, the LBO schedule mechanism receives a margin LBO_ADJ input 330, C2 input 332, a NUM input 334, a TEMP input 336, a C1 input 338, a speed input 340, a C4 input 342, a C3 input 344, a MIN1 input 346 and a MIN2 input 348. Additionally, the LBO schedule mechanism 300 receives the LBO bias input 298 from the LBO bias mechanism.

In operation, the division logic 302 divides the NUM input 334 by the TEMP input 336. Typically, the NUM input 334 is set to 1.0, and the output of the division logic 302 is thus the inverse of the TEMP input 336. A variety of temperature data sources could be used as the TEMP input, including the total inlet temperature (TT2). A constant is received from the C1 input 338, and the subtraction logic 304 subtracts the constant C1 from the output of the division logic 302. The result is passed to limiter logic 306, which prevents the output from falling below the MIN1 output value (e.g., 0). The multiplication logic 308 multiples the output of the limiter logic 306 is by a constant received from the C2 input 332.

Multiplication logic 310 multiplies the speed input 340 by a constant received from the C4 input 342, and the resulting product is subtracted from the constant received from the C3 input 344 by subtraction logic 312. The addition logic 314 adds the output of the subtraction logic 312 to the output of the multiplication logic 308. The addition logic 316 adds the output of the addition logic 314 to the LBO_ADJ input 330. The result is passed to limiter logic 318, which prevents the output from falling below the MIN2 output value (e.g., 3.0 fuel ratio). The output of the limiter logic 318 is the preliminary LBO value, which is then added to the LBO bias input 298 using addition logic 320.

In general, the engine speed and temperature are combined with the constants C1, C2, C3 and C4 to determine the preliminary LBO value. The LBO_ADJ input 330 provides the ability for the initial value to be manually adjusted. The values for C1, C2, C3 and C4 would depend on the particular turbine engine and its application, and would be selected to convert the speed and temperature values into appropriate fuel ratios for the engine.

The lean blowout protection system 100 can be implemented in a wide variety of different types of turbine engines. Thus, although the present embodiment is, for convenience of explanation, depicted and described as being implemented in combination with a multi-spool turbofan gas turbine jet engine, it will be appreciated that it can be implemented in various other types of turbines, and in various other systems and environments.

Figure 4:
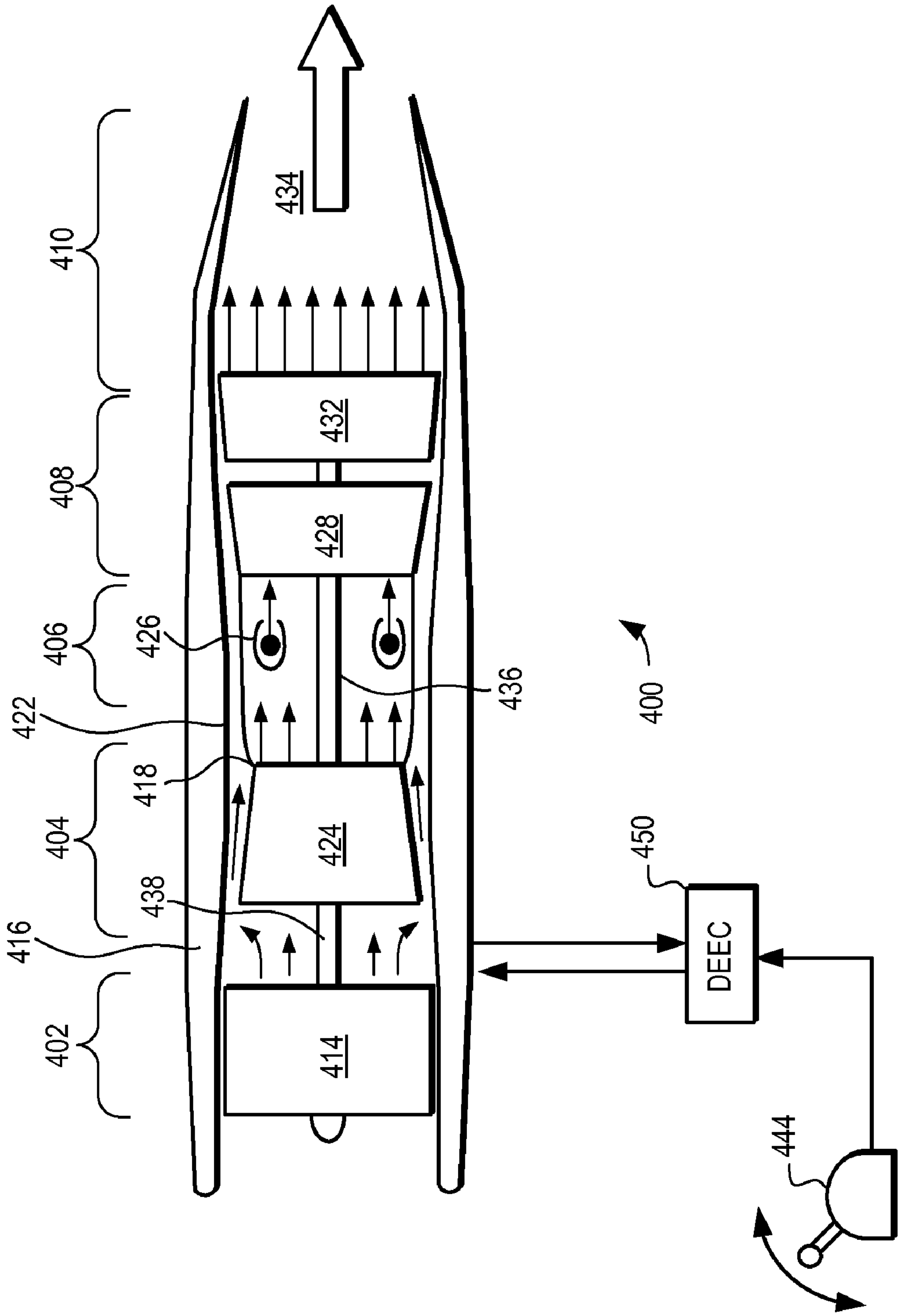
FIG. 4 is a schematic view of an exemplary turbine engine in accordance with an embodiment of the invention.

Turning now to FIG. 4, an embodiment of an exemplary multi-spool gas turbine main propulsion engine 400 is shown, and includes an intake section 402, a compressor section 404, a combustion section 406, a turbine section 408, and an exhaust section 410. The intake section 402 includes a fan 414, which is mounted in a fan case 416. The fan 414 draws air into the intake section 402 and accelerates it. A fraction of the accelerated air exhausted from the fan 114 is directed through a bypass section 418 disposed between the fan case 416 and an engine cowl 422, and generates propulsion thrust. The remaining fraction of air exhausted from the fan 414 is directed into the compressor section 404.

The compressor section 404 may include one or more compressors 424, which raise the pressure of the air directed into it from the fan 414, and directs the compressed air into the combustion section 406. In the depicted embodiment, only a single compressor 424 is shown, though it will be appreciated that one or more additional compressors could be used. In the combustion section 406, which includes a combustor assembly 426, the compressed air is mixed with fuel supplied from a fuel source (not shown). The fuel/air mixture is combusted, generating high energy combusted gas that is then directed into the turbine section 408.

The turbine section 408 includes one or more turbines. In the depicted embodiment, the turbine section 408 includes two turbines, a high pressure turbine 428, and a low pressure turbine 432. However, it will be appreciated that the propulsion engine 400 could be configured with more or less than this number of turbines. No matter the particular number, the combusted gas from the combustion section 406 expands through each turbine 428, 432, causing it to rotate. The gas is then exhausted through a propulsion nozzle 434 disposed in the exhaust section 410, generating additional propulsion thrust. As the turbines 428, 432 rotate, each drives equipment in the main propulsion engine 400 via concentrically disposed shafts or spools. Specifically, the high pressure turbine 428 drives the compressor 424 via a high pressure spool 436, and the low pressure turbine 432 drives the fan 414 via a low pressure spool 438.

As FIG. 4 additionally shows, the main propulsion engine 400 is controlled, at least partially, by an engine controller 450 such as, for example, a DEEC (Digital Electronic Engine Controller). The engine controller 450 controls the operation of the main propulsion engine 400. More specifically, the engine controller 450 receives selected signals from various sensors and from various pilot-manipulated controls and, in response to these signals, controls the overall operation of the propulsion engine 400. A variety of different sensors can be used by the engine controller, including various speed sensors, including fan speed (N1) and main shaft speed (N2) sensors, temperature sensors, fuel flow and pressure sensors. Additionally, a power lever angle (PLA) signal can also be included and used by the engine controller 450.

In one embodiment of the invention, the lean blowout protection system is implemented at least partially in the engine controller 450. For example, the lean blowout protection system can be implemented at least partially as software that is executed by the engine controller 450. The lean blowout protection system would receive the various sensor data and generate an LBO schedule which is then used by the engine controller 450 to define the minimum fuel flow delivered to the turbine engine. Specifically, during operation of the turbine engine the engine controller 450 ensures that that the commanded fuel flow to the turbine engine does not go below the LBO schedule determined by the lean blowout protection system, thus providing lean blowout protection for the turbine engine. As described above, the lean blowout protection system adds a gradually increasing positive bias to the LBO schedule when the commanded fuel flow is greater than the LBO schedule by a specified margin. Then, when the commanded fuel flow falls below the margin the system decreases the positive bias until the commanded fuel flow reaches the LBO schedule. The increasing and decreasing of the LBO bias provides a selectively increased LBO schedule that improves lean blowout protection while maintaining fuel flow control ability to quickly decelerate the engine.

Figure 5:
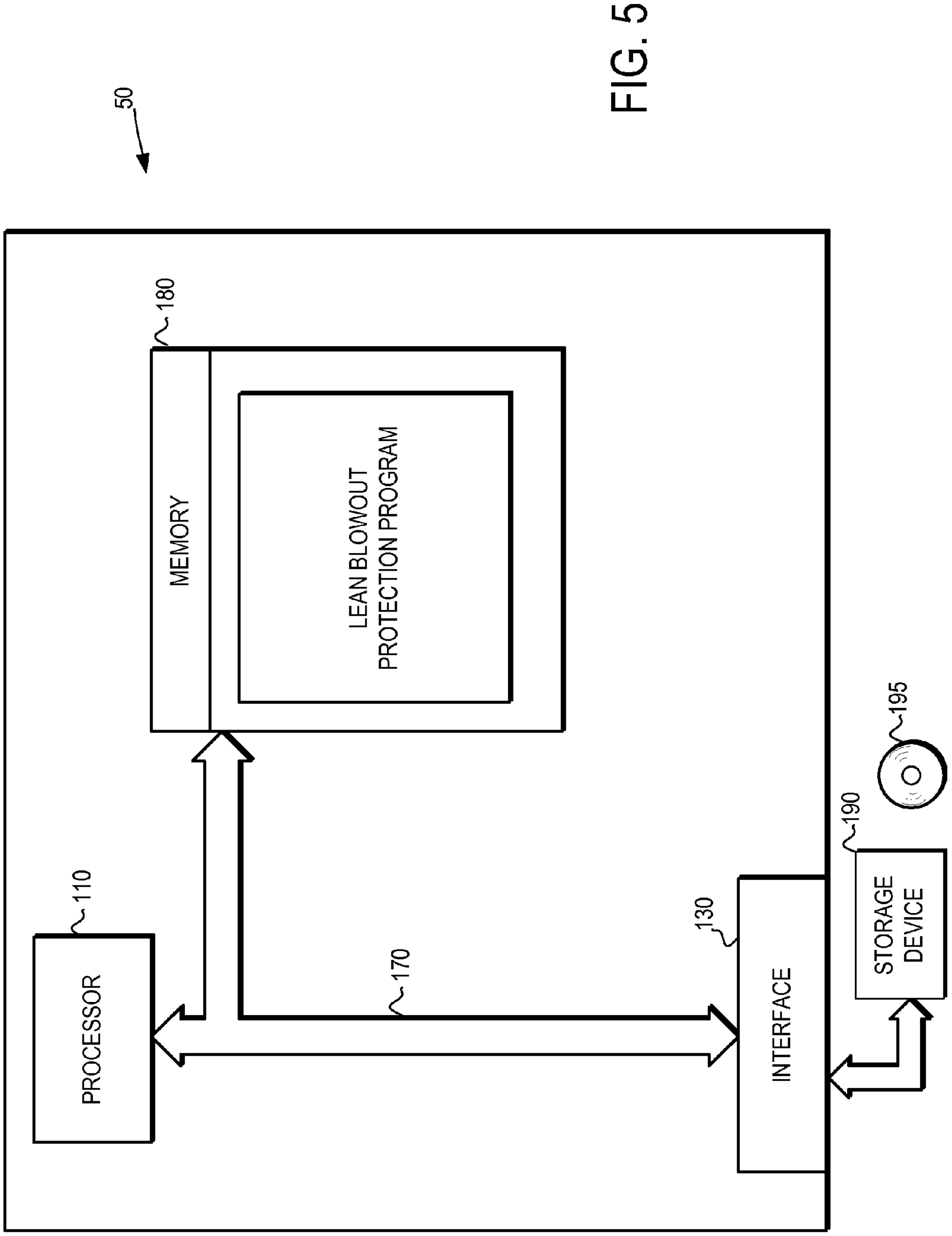
FIG. 5 is a schematic view of a computer system that includes a lean blowout protection program.

The lean blow out protection system can be implemented in a wide variety of computational platforms. Turning now to FIG. 5, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. The exemplary computer system 50 includes a processor 110, an interface 130, a storage device 190, a bus 170 and a memory 180. In accordance with the preferred embodiments of the invention, the memory 180 includes a lean blowout protection program.

The processor 110 performs the computation and control functions of the system 50. The processor 110 may comprise any type of processor, including single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different systems that collectively comprise system 50.

The bus 170 serves to transmit programs, data, status and other information or signals between the various components of system 50. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 5, storage device 190 can comprise a disc drive device that uses discs 195 to store data.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of computer-readable signal bearing media include: recordable media such as floppy disks, hard drives, memory cards and optical disks (e.g., disk 195).

Thus, the embodiments of present invention provide a turbine engine lean blowout protection system and method that facilitates improved lean blowout protection while providing effective control of turbine engine speed. The lean blowout protection system and method selectively and gradually biases the lean blowout (LBO) schedule based on current engine data. This facilitates improved lean blowout protection while providing effective control of turbine engine speed and temperature.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A lean blowout protection system for reducing a probability of lean blowout in a turbine engine, the system comprising:

an LBO schedule mechanism, the LBO schedule mechanism adapted to receive engine data and generate an initial LBO value; and an LBO bias mechanism, the LBO bias mechanism adapted to receive engine data and selectively provide a bias to the initial LBO value to generate an LBO schedule, the LBO bias mechanism adapted to selectively gradually increase and selectively gradually decrease the bias in response to the engine data.

2. The system of claim 1 wherein the LBO bias mechanism is adapted to gradually increase the bias when a commanded fuel flow is greater than the LBO schedule by a specified margin.

3. The system of claim 2 wherein the LBO bias mechanism is adapted to gradually increase the bias to a specified maximum bias level.

4. The system of claim 1 wherein the LBO bias mechanism is adapted to gradually decrease the bias when a commanded fuel flow is below the LBO schedule plus a specified margin until the bias reaches zero.

5. The system of claim 1 wherein the LBO bias mechanism is adapted to selectively disables the bias when the engine data indicates a takeoff situation after a relatively short delay and selectively enable the bias when the engine data no longer indicates a takeoff situation after a relatively longer delay.

6. The system of claim 1 wherein the LBO bias mechanism is adapted to selectively disable the bias when the engine data indicates an engine speed within a specified percentage of a takeoff engine speed.

7. The system of claim 1 wherein the LBO bias mechanism is adapted to selectively decrease the bias to a minimum limit when the engine data indicates an engine startup situation.

8. The system of claim 1 wherein the LBO bias mechanism is adapted to gradually decrease the bias to a minimum limit when the engine data indicates an engine speed within a specified percentage of a startup engine speed.

9. The system of claim 1 wherein the LBO bias mechanism is adapted to gradually increase the bias when a commanded fuel flow is greater than the LBO schedule by a specified margin to a specified maximum bias level and wherein the LBO bias mechanism is adapted to gradually decrease the bias when a commanded fuel flow is below the LBO schedule plus the specified margin until the bias reaches zero, and wherein the LBO bias mechanism is adapted to gradually decrease the bias until the bias reaches zero when the engine data indicates an engine speed within a specified percentage of a startup engine speed and wherein the LBO bias mechanism is adapted to selectively disable the bias when the engine data indicates a takeoff situation after a relatively short delay and selectively enable the bias when the engine data no longer indicates a takeoff situation after a relatively longer delay.

10. A program product comprising:

a) a lean blowout protection program for reducing a probability of lean blowout in a turbine engine, the lean blowout protection program including:

an LBO schedule mechanism, the LBO schedule mechanism adapted to receive engine data and generate an initial LBO value; and an LBO bias mechanism, the LBO bias mechanism adapted to receive engine data and selectively provide a bias to the initial LBO value to generate an LBO schedule, the LBO bias mechanism adapted to selectively gradually increase and selectively gradually decrease the bias in response to the engine data; and b) computer-readable signal bearing media bearing said program.

11. The program product of claim 10 wherein the LBO bias mechanism is adapted to gradually increase the bias when a commanded fuel flow is greater than the LBO schedule by a specified margin.

12. The program product of claim 11 wherein the LBO bias mechanism is adapted to gradually increase the bias to a specified maximum bias level.

13. The program product of claim 10 wherein the LBO bias mechanism is adapted to gradually decrease the bias when a commanded fuel flow is below the LBO schedule plus a specified margin until the bias reaches zero.

14. The program product of claim 10 wherein the LBO bias mechanism is adapted to selectively disable the bias when the engine data indicates a takeoff situation after a relatively short delay and selectively enable the bias when the engine data no longer indicates a takeoff situation after a relatively longer delay.

15. The program product of claim 10 wherein the LBO bias mechanism is adapted to selectively disable the bias when the engine data indicates an engine speed within a specified percentage of a takeoff engine speed.

16. The program product of claim 10 wherein the LBO bias mechanism is adapted to selectively decrease the bias to a minimum limit when the engine data indicates an engine startup situation.

17. The program product of claim 10 wherein the LBO bias mechanism is adapted to gradually decrease the bias to a minimum limit when the engine data indicates an engine speed within a specified percentage of a startup engine speed.

18. The program product of claim 10 wherein the LBO bias mechanism is adapted to gradually increase the bias when a commanded fuel flow is greater than the LBO schedule by a specified margin to a specified maximum bias level and wherein the LBO bias mechanism is adapted to gradually decrease the bias when a commanded fuel flow is below the LBO schedule plus the specified margin until the bias reaches zero, and wherein the LBO bias mechanism is adapted to gradually decrease the bias until the bias reaches zero when the engine data indicates an engine speed within a specified percentage of a startup engine speed and wherein the LBO bias mechanism is adapted to selectively disable the bias when the engine data indicates a takeoff situation after a relatively short delay and selectively enable the bias when the engine data no longer indicates a takeoff situation after a relatively longer delay.

19. A lean blowout protection system for reducing a probability of lean blowout in a turbine engine, the system comprising:

an LBO schedule mechanism, the LBO schedule mechanism adapted to receive engine data and generate an initial LBO value; and an LBO bias mechanism adapted to receive engine data and selectively provide a bias to the initial LBO value to generate an LBO schedule, the LBO bias mechanism further adapted to:

increase the bias to a specified maximum bias level in response to a commanded fuel flow being greater than the LBO schedule by a specified margin;

decrease the bias until the bias reaches zero in response to the commanded fuel flow being below the LBO schedule plus the specified margin; and decrease the bias until the bias reaches zero in response to the engine data indicating an engine speed within a specified percentage of a startup engine speed.

20. The lean blowout protection system of claim 19 wherein the LBO bias mechanism is further adapted to selectively disable the bias in response to the engine data indicating a takeoff situation after a relatively short delay and selectively enable the bias in response to the engine data no longer indicating a takeoff situation after a relatively longer delay.

* * * * *